United States Patent [19]
Wilson et al.

[11] Patent Number: 5,587,256
[45] Date of Patent: Dec. 24, 1996

[54] CARBONACEOUS INSERTION COMPOUNDS AND USE AS ANODES IN RECHARGEABLE BATTERIES

[75] Inventors: Alfred M. Wilson, Burnaby; Jeffery R. Dahn, Surrey, both of Canada

[73] Assignee: Moli Energy (1990) Limited, Canada

[21] Appl. No.: 428,042

[22] Filed: Apr. 25, 1995

[30] Foreign Application Priority Data

Jul. 8, 1994 [CA] Canada ................................. 2127621

[51] Int. Cl.[6] .................................................. H01M 4/02
[52] U.S. Cl. ...................... 429/218; 429/194; 29/623.1; 423/415.1; 423/420.2; 423/421
[58] Field of Search .................................. 429/218, 194; 423/415.1, 420.2, 421; 29/623.1

[56] References Cited

U.S. PATENT DOCUMENTS 5,130,211  7/1992  Wilkinson et al. .

FOREIGN PATENT DOCUMENTS

| 2098248 | 6/1993 | Canada . |
| 357001A1 | 8/1989 | European Pat. Off. . |
| 486950A1 | 11/1991 | European Pat. Off. . |
| 582173 | 2/1994 | European Pat. Off. . |
| 615296 | 9/1994 | European Pat. Off. . |
| 3-245458 | 2/1990 | Japan . |
| 5-182668 | 7/1993 | Japan . |
| 6-96759 | 4/1994 | Japan . |

OTHER PUBLICATIONS

Wilson et al, "Lithium insertion in Pyrolyzed Siloxane Polymers" Solid State Ionics 74(1944) 249–254 (month N/A).

Wilson et al, "Lithium Insertion in Carbons Containing Nanodispersed Silicon" J. Electrochem. Soc., vol. 142 No. 2, pp. 326–332 (1995) (month N/A).

J. R. Dahn, et al., "Carbons and Graphites as Substitutes for the Lithium Anode", from Lithium Batteries—New Materials, Developments and Perspectives, ed. G. Pistoia, Elsevier (no Month or Year).

J. Yamaura, et al., "High voltage, rechargeable lithium batteries using newly–developed carbon for negative electrode material", Journal of Power Sources, 43–44 (1993), pp. 233≧239 (month N/A).

K. Sato, et al., "A Mechanism of Lithium Storage in Disordered Carbons", Science, vol. 264, Apr. 22, 1994, pp. 556–558.

A. Mabuchi, et al., "Charge–Discharge Characteristics of the Mesocarbon Microbeads Heat–treated at Different Temperatures", 7th International Meeting on Lithium Batteries, Extended Abstracts, p. 212, Boston, Mass. (1994) (month N/A).

Y. Toyoguchi, et al., "New Negative Electrodes for Secondary Lithium Batteries", Progress in Batteries & Solar Cells, vol. 6 (1987), pp. 58–60 (Month N/A).

K. Ozawa, et al., "Cycle Performance of Lithium Ion Rechargeable Battery", 10th International Seminar of Primary and Secondary Battery Technology and Application, Mar. 1–4, 1993, Deerfield Beach, Florida.

*Primary Examiner*—M. Nuzzolillo
*Attorney, Agent, or Firm*—Lerner, David Littenberg, Krumholz & Mentlik

[57] ABSTRACT

Carbonaceous insertion compounds and methods for preparation are described wherein the compounds comprise a pre-graphitic carbonaceous host and atoms of an element capable of alloying with alkali metal atoms, the alloying atoms being incorporated predominantly as monodispersed atoms in the host. A carbonaceous insertion compound with large reversible capacity for lithium can be prepared if the alloying atoms incorporated are Si. Such insertion compounds can be prepared by simple pyrolysis of suitable polymers containing silicon and carbon at an appropriate temperature. These insertion compounds may be suitable for use as high capacity anodes in lithium ion batteries.

46 Claims, 9 Drawing Sheets

SILOXANES

POLY (SILMETHYLENES)

POLY (SILOXANE-SILPHENYLENES)

POLYSILANES

POLYPHENYLSESQUISILOXANE

POLY (SILPHENYLENES)

--- SAMPLE I
— SAMPLE III
— SAMPLE VI

1

CARBONACEOUS INSERTION COMPOUNDS AND USE AS ANODES IN RECHARGEABLE BATTERIES

FIELD OF THE INVENTION

The invention pertains to the field of carbonaceous materials and, in particular, to pre-graphitic carbonaceous insertion materials. Additionally, the invention pertains to the field of rechargeable batteries and, in particular, to rechargeable batteries comprising carbonaceous anode materials.

BACKGROUND OF THE INVENTION

Within the enormous group consisting of carbonaceous compounds is a set of pre-graphitic compounds that are generally prepared at low temperatures (eg: less than about 2000° C.) from various organic sources and that tend to graphitize when annealed at higher temperatures. There are however both hard and soft pre-graphitic carbon compounds, the former being difficult to graphitize substantially even at temperatures of order of 3000° C., and the latter, on the other hand, being virtually completely graphitized around 3000° C.

The aforementioned set of compounds has been of great interest lately for use as anode materials in what is called lithium-ion or rocking chair type batteries. These batteries represent the state of the art in small rechargeable power sources for commercial electronics applications. Typically, these batteries have about twice the energy density (Wh/L) of conventional rechargeable systems (such as NiCd or lead acid batteries). Additionally, lithium ion batteries operate around 3 ½ volts which is often sufficiently high such that a single cell can suffice for many electronics applications.

Lithium ion batteries use two different insertion compounds for the active cathode and anode materials. Insertion compounds are those that act as a host solid for the reversible insertion of guest atoms (in this case, lithium atoms). The structure of the insertion compound host is not significantly altered by the insertion. In a lithium ion battery, lithium is extracted from the anode material while lithium is concurrently inserted into the cathode on discharge of the battery. The reverse processes occur on recharge of the battery. Lithium atoms travel or "rock" from one electrode to the other as ions dissolved in a non-aqueous electrolyte with associated electrons travelling in the circuit external to the battery.

The two electrode materials for lithium ion batteries are chosen such that the chemical potential of the inserted lithium within each material differs by about 3 to 4 electron volts thus leading to a 3 to 4 volt battery. It is also important to select insertion compounds that reversibly insert lithium over a wide stoichiometry range thus leading to a high capacity battery.

A 3.6 V lithium ion battery based on a $LiCoO_2$/ pregraphitic carbon electrochemistry is commercially available (produced by Sony Energy Tec.) wherein the carbonaceous anode can reversibly insert about 0.65 Li per six carbon atoms. (The pre-graphitic carbon employed is a disordered form of carbon which appears to be similar to coke.) However, the reversible capacity of lithium ion battery anodes can be increased by using a variety of alternatives mentioned in the literature. For example, the crystal structure of the carbonaceous material affects its ability to reversibly insert lithium (as described in J.R. Dahn et al., "Lithium Batteries, New Materials and New Perspectives", edited by G. Pistoia, Elsevier North-Holland, p1-47, (1993)). Graphite for instance can reversibly incorporate one lithium per six carbon atoms which corresponds electrochemically to 372 mAh/g. This electrochemical capacity per unit weight of material is denoted as the specific capacity for that material. Graphitized carbons and/or graphite itself can be employed under certain conditions (as for example in the presentation by Matsushita, 6th International Lithium Battery Conference, Muenster, Germany, May 13, 1992, or in U.S. Pat. No. 5,130,211).

Other alternatives for increasing the specific capacity of carbonaceous anode materials have included the addition of other elements to the carbonaceous compound. For example, European Patent Application No. EP486950 and Japanese Application Laid-Open No. 03-245458 mention the addition of small amounts of phosphorous and boron respectively to enhance the anode specific capacity. The mechanism behind this effect is unclear but it may be a result of modifications to the microstructure of the carbonaceous compound. Also, Canadian Application Serial No. 2,098,248 discloses a means for enhancing anode capacity by substituting electron acceptors (such as boron, aluminum, and the like) for carbon atoms in the structure of the carbonaceous compound.

Most recently, two groups have prepared carbonaceous materials with very high reversible capacity by pyrolysis of suitable starting materials. K. Sato et al. in Science 264, 556, (1994) disclosed a carbonaceous material prepared by heating polyparaphenylene at 700° C. which has a reversible capacity of 680 mAh/g. At the Seventh International Meeting on Lithium Batteries, Extended Abstracts Page 212, Boston, Mass. (1994), A. Mabuchi et al. disclosed a low density (about 1.5 g/cc) carbonaceous material prepared by heating coal tar pitch at 700° C. which has a reversible capacity of about 750 mAh/g. These values are much greater than that of pure graphite. However, both materials have a very large irreversible capacity as evidenced by first discharge capacities of over 1000 mAh/g for the former and about 1200 mAh/g for the latter. Both materials also are crystalline enough to exhibit x-ray patterns from which the parameters $d_{002}$, $L_c$, a, and $L_a$ can be determined. Neither material therefore incorporates additional elements (such as electron acceptors) and neither material is amorphous based on x-ray diffraction. It is unknown yet why these carbonaceous materials exhibit such high capacity.

Historically, however, metallic lithium was preferred as an anode material during development of rechargeable lithium batteries. Lithium metal has a specific capacity of 3.86 Ah/g, significantly greater than presently known alternatives. There are however numerous problems associated with the use of metallic lithium as an anode, most notably its poor safety record in larger battery sizes (of order of AA size or greater). The use of lithium metal anodes in rechargeable batteries has effectively been limited to very small consumer configurations (such as coin cells) or to military applications and the like.

Anode materials other than pure lithium have also been proposed and include a class of lithium alloys such as those listed in the following Table 1. Mixed alloys have also been proposed as illustrated in Y. Toyoguchi et al., Progress in Batteries and Solar Cells, 6, 58 (1987). As shown in Table 1, lithium alloys can comprise significant amounts of lithium that can be extracted and re-alloyed in principle. However, in practice, there are large volume charges associated with varying the stoichiometry of lithium in these alloys between the limits shown. These volume changes have several effects in a battery application. Firstly, the alloy anode tends to crack and fragment upon repeated alloying/extraction cycles which reduces the anode to "dust". This can result in integrity problems for the anode. Secondly, as a result of said fragmentation, the surface area of the anode increases. Since these materials are close to the chemical potential of lithium, the lithium within the alloy gets continually consumed via reaction with the battery electrolyte in the formation of passivating films on newly exposed anode surface. This reaction is undesirable since it consumes lithium irreversibly, thus resulting in overall capacity loss in a battery. Finally, an increase in surface area of a reactive anode can lead to increased sensitivity to thermal runaway, a major safety concern.

TABLE 1

LI-ALLOY ANODE MATERIALS FOR SECONDARY LI BATTERIES

| Material | Range of x | Specific Capacity mAh/g of alloying element | Average Voltage versus Li (V) | Reference** |
|---|---|---|---|---|
| $Li_xSn$ | 0.4–4.5 | 902 | 0.5 | 2 |
| $Li_xAl$ | 0.0–1.0 | 992 | 0.3 | 3 |
| $Li_xSi$ | 0.0–4.2 | 4017 | 0.2 | 4 |
| $Li_xCd$ | 1.0–3.0 | 476 | 0.07 | 2 |
| $Li_xPb$ | 1.0–4.4 | 440 | 0.2 | 4 |
| $Li_xBi$ | 0.0–3.0 | 384 | 0.8 | 4 |
| $Li_xSb$ | 0.0–3.0 | 658 | 0.95 | 4 |
| $Li_xC_6$* | 0.0–1.0 | 372 | 0.1 | 1 |

*Denotes an intercalation compound for comparative purposes.
**Reference 1 is J. R. Dahn et al. in "Lithium Batteries, New Materials and New Perspectives", edited by G. Pistoia, Elsevier North-Holland, p1–47, (1993). Reference 2 is A. Anani et al., Proceedings of the Electrochemical Society, 87-1, 382–92 (1987). Reference 3 is J. Wang et al., Solid State Ionics, 20, 185 (1986). Reference 4 is R. A. Huggins, Proceedings of the Electrochemical-Society 87-1, 356–64 (1987).

The use of carbonaceous insertion compounds as anodes has avoided the aforementioned problems with lithium alloy anodes. Since the volume changes associated with lithium insertion are small, little or no fragmentation of the carbonaceous compounds occurs. Thus, anode integrity can be maintained more easily and the anode surface area can be kept from increasing. No significant capacity loss due to further passivation film formation on fresh surfaces need occur and the thermal stability of the battery need not worsen with cycle number. Commercial batteries with carbonaceous insertion compound anodes have achieved over a thousand charge-discharge cycles without significant capacity loss and with an actual slight improvement in safety to abuse (as shown in K. Ozawa et al., The Tenth International Seminar On Primary And Secondary Battery Technology And Application, Mar. 1–4, 1993, Deerfield Beach, Fla.).

Co-pending Canadian Patent Application titled 'Carbonaceous Host Compounds and Use as Anodes in Rechargeable Batteries' filed May 3, 1994 discloses carbonaceous insertion compounds that comprise a pregraphitic carbonaceous host, having both organized and disorganized structural regions, and atoms of an element capable of forming alloys with an alkali metal. The alloying atoms are incorporated into the carbonaceous host without substantially affecting the structure of the organized regions, as evidenced by x-ray diffraction measurements. The alloying atoms can be incorporated predominantly as monodispersed atoms in the disorganized regions of the host. (The term 'monodispersed' is intended to include single atoms and/or small clusters of the alloying element such that the resulting compound exhibits properties more characteristic of single atoms of the alloying element than that of a bulk compound of the alloying element.) Certain compounds of this invention are attractive for use as anode materials in lithium ion batteries. When the alloying atoms are silicon for example, the reversible capacity of the compounds of the invention can be increased over that of the carbonaceous host alone while still maintaining cycling performance similar to the carbonaceous host. Thus, it appears that the compounds of the invention can combine to some extent the attractive features of the capacity of the alloying element with the cycling stability of a carbonaceous compound.

Example compounds in the aforementioned Canadian patent application were prepared by chemical vapour deposition methods although it was expected that similar results could be obtained by pyrolysis of suitable polymer precursors. Other carbonaceous compounds with high Specific capacity have been prepared by such pyrolysis techniques. For example, Sony Energy Tec (in European Patent Publication Number 357,001) has reported preparing a carbonaceous compound containing phosphorus with a specific capacity of about 450 mAh/g by pyrolyzing polyfurfuryl alcohol. The polyfurfuryl alcohol in turn had been prepared from the monomer polymerized in the presence of phosphoric acid.

SUMMARY OF TEE INVENTION

Subject matter of the invention includes carbonaceous insertion compounds, methods of preparing said compounds, and the use of said compounds as electrode materials in electrochemical devices in general.

The carbonaceous insertion compounds comprise a pregraphitic carbonaceous host C; atoms of an alkali metal A inserted into the host, the amount of A being in a range from greater than or equal to zero; and atoms of an element B incorporated into the host, the amount of B being greater than zero, wherein B is capable of forming alloys with A and the atoms of element B are incorporated predominantly as monodispersed atoms in the host.

The structure of the carbonaceous insertion compound can be predominantly disorganized resulting in an x-ray diffraction pattern of the compound that is very poorly developed or amorphous.

The alloying element B can be selected from the group consisting of Al, Bi, Cd, Pb, Sb, and Sn. Also, in particular, the alloying element B can be Si. The alkali metal A inserted into the host can be any member of the Group 1a elements of the periodic table and, in particular, can be lithium.

Other elements can be present in silicon containing carbonaceous insertion compounds of the invention. Such compounds can be represented by the formula $A_xSi_yC_{1-y}O_zH_n$ wherein O is oxygen, H is hydrogen, and x,y,z,n are numbers; x being greater than or equal to zero; y being in the range from greater than zero to less than about 0.3; the ratio z/y being greater than or equal to zero and less than or equal to about 1.5; and n being less than about 0.3.

Alternately, certain silicon containing carbonaceous insertion compounds of the invention can be described by a known process of preparation.

A general process for preparing the compounds of the invention comprises: pyrolyzing a polymer containing the elements B and carbon wherein the pyrolysis is performed at a temperature above the decomposition temperature of the polymer and below the minimum of the temperatures for forming a carbide or oxide of the element B from the pyrolyzed polymer. The temperature for forming said carbide or oxide will be dependent on the polymer used and thus varies accordingly. In the case of silicon containing carbonaceous insertion compounds, a polymer containing silicon and carbon is used in the pyrolysis which is performed at a temperature above the decomposition temperature of the polymer and below the minimum of the temperatures for forming SiC or $SiO_2$ from the pyrolyzed polymer. The pyrolysis can be performed under an inert atmosphere but, alternatively, it may be advantageous to partially reduce or oxidize the pyrolyzed product in an appropriate atmosphere.

For silicon containing carbonaceous insertion compounds, the polymer containing silicon and carbon can be selected from the group of siloxanes having formula:

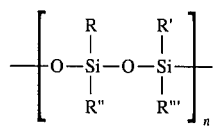

wherein R, R', R", and R''' are alkyl, aryl, or general ligands. In particular, the polymer can be polymethylphenylsiloxane wherein R=R'=methyl and R"=R'''=phenyl. The pyrolysis temperature in this instance can be above or equal to about 900° C. and below or equal to about 1100° C.

Alternately, the polymer containing silicon and carbon can be polyphenylsesquisiloxane and the pyrolysis temperature in this instance can be above about 500° C. and in particular about 1000° C.

It is expected that other polymers containing silicon and carbon can be used to prepare silicon containing carbonaceous insertion compounds of the invention. The polymer might be selected from the groups of poly(siloxanesilphenylenes), poly(silmethylenes), polysilanes, or poly(silphenylenes).

In general, in order to prepare silicon containing carbonaceous insertion compounds of the invention, it is expected that polymers having the formula $Si_{y'}C_{1-y'}O_{z'}H_{n'}$ wherein O is oxygen, H is hydrogen, and y',z',n' are numbers; y' being in the range from greater than zero to less than about 0.3; and the ratio z'/y' being less than or equal to about 1.5 might be used since it should be possible to avoid the formation of silicon carbide or oxide with such stoichiometries.

The silicon containing product of the aforementioned processes may have no alkali metal inserted as prepared and alkali metal atoms A can be inserted thereafter via chemical or electrochemical means.

Electrochemical devices of the invention comprise an electrode wherein a portion of the electrode comprises a carbonaceous insertion compound of the invention. The device can be a battery and, in particular, can be a non-aqueous battery comprising: a cathode comprising a lithium insertion compound; a non-aqueous electrolyte comprising a lithium salt dissolved in a mixture of non-aqueous solvents; and an anode comprising the carbonaceous insertion compound of the invention wherein the alkali metal A is Li.

DETAILED DESCRIPTION OF THE SPECIFIC EMBODIMENTS OF THE INVENTION

Figure 1:
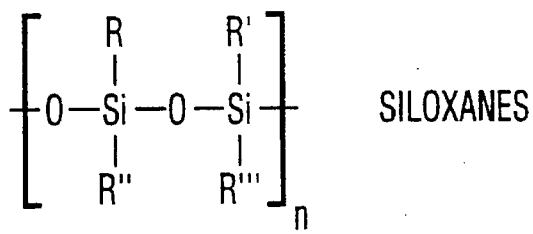
FIG. 1 shows the chemical structures for potential precursors or groups of precursors for compounds of the invention. The groups R, R', R", R''' denote alkyl, aryl, or general ligands. The specific ligands methyl and phenyl are denoted Me and Ph respectively where appropriate.
Figure 1:
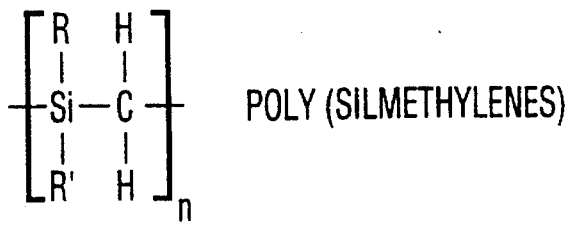
Figure 1:
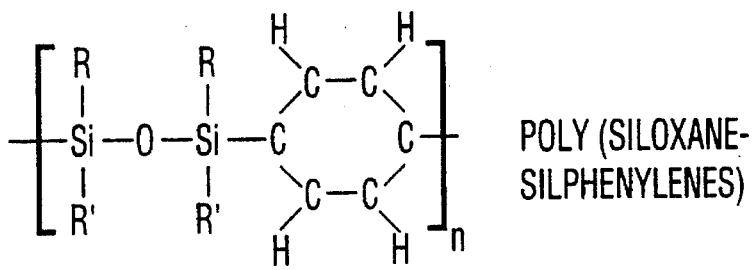
Figure 1:
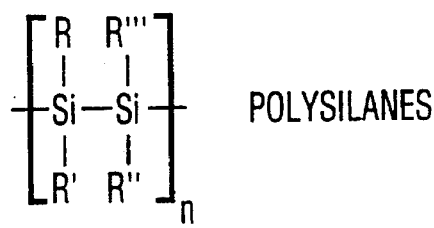
Figure 1:
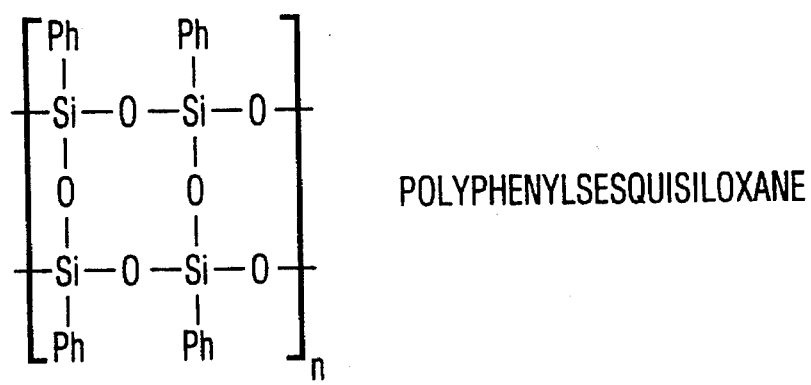
Figure 1:
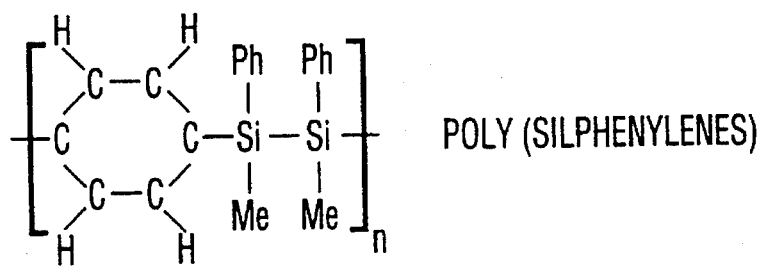

The carbonaceous insertion compounds of the invention comprise a pre-graphitic carbonaceous host C, atoms of an alkali metal A inserted into the host, and atoms of an element B incorporated into the host, wherein B is capable of forming alloys with A. The atoms of alloying element B are incorporated predominantly as monodispersed atoms in the host wherein the term monodispersed is intended to include single atoms and/or small clusters of the alloying element such that the resulting compound exhibits properties more characteristic of single atoms of the alloying element than that of a bulk compound of the alloying element. The amount of alloying element B present must be greater than zero.

The structure of the carbonaceous insertion compound can be predominantly disorganized resulting in an x-ray diffraction pattern of the compound that is very poorly developed or amorphous. This suggests that the compounds are not necessarily the same as those described in the aforementioned co-pending Canadian patent application filed May 3, 1994.

It is expected that the alloying element B might be selected from the group known in the literature to alloy with lithium which includes Al, Bi, Cd, Pb, Sb, and Sn. (Members in this group are additionally known to or can be expected to alloy with other alkali metals from the Group 1a elements of the periodic table.) For the greatest specific lithium capacity, the preferred theoretical (based on Table 1 data) alloying element is Si. Additionally, based on the preceding, it is expected that the alkali metal A inserted into the host might be any alkali metal.

Certain compounds of this invention are attractive for use as anode materials in lithium ion batteries. When the alloying atoms are silicon, the reversible Capacity of the compound of the invention can be increased over that of the carbonaceous host alone while still maintaining cycling performance similar to the carbonaceous host. Thus, it appears that the compounds of the invention can combine to some extent the attractive features of the capacity of the alloying element with the cycling stability of a carbonaceous compound.

While compounds of the invention may exhibit characteristics or properties that are similar to those of the carbonaceous host and/or the alloying element, the compound is not however simply a mixture of a carbonaceous host and a bulk compound of the alloying element. The presence of a bulk compound of the alloying element is not indicated in x-ray diffraction measurements. Also, other characteristics expected of a bulk compound of the alloying element (such as rapid loss with cycle number of all the capacity attributed to the alloying element) are not evident in electrochemical cycling trials.

Without wishing to be bound by theory, adversely or otherwise, it is expected that, in order to incorporate the alloying element B as monodispersed atoms, it is necessary to maintain a sufficiently high carbon to alloying element atomic ratio in order to dilute the atoms of B sufficiently. Also, in preparation processes that involve heating, formation of a carbide compound could be expected instead if said ratio is too low. It can additionally be advantageous to maintain a high carbon content for purposes of imparting reasonable electrical conductivity to the product compound. In a like manner, it is expected that a sufficiently high carbon to oxygen atomic ratio must be maintained to inhibit formation of oxides. Thus, a limit is required both to the amount of oxygen present in a precursor material and to the amount of oxygen gas present during any heating of the precursor or compound of the invention itself. (It may be of advantage however to allow for some slight oxidation of the product compound.)

It may be possible to incorporate significant amounts of alloying element B in the carbonaceous insertion compound. Additionally, other elements might also be present while still enabling use of the compound as an electrode material. For example, such possibilities include silicon containing compounds having the formula $A_xSi_yC_{1-y}O_zH_n$ wherein O (oxygen) and H (hydrogen) are additionally present. Based on values achieved in the following examples, it is expected that the ranges for y, z, and n in silicon containing compounds of the invention may be such that y is greater than zero and less than about 0.3, the ratio z/y is greater than or equal to zero and less than or equal to about 1.5, and n is greater than or equal to zero and less than about 0.3.

Generally, to prepare silicon containing carbonaceous insertion compounds of the invention in the manner of the following examples, suitable precursor polymers may have to have greater than or equal to about 3 carbon atoms per Si atom to prevent formation of SiC and less than or equal to about 1.5 oxygen atoms per carbon atom to prevent formation of $SiO_2$ during any high temperature synthesis step. In other words, polymers having the formula $Si_{y'}C_{1-y'}O_{z'}H_{n'}$ may be suitable as precursors if y' is in the range greater than zero to less than about 0.3 and the ratio z'/y' is less than or equal to about 1.5. It is expected however that a precursor material may lose hydrogen, oxygen, or carbon in the early stages of any high temperature synthesis step, thus being unavailable for reaction later. Thus, suitable precursor materials may have significant hydrogen content and oxygen or carbon contents that initially exceed these anticipated limits since such loss may result in the limits being met prior to reaching critical reaction temperatures.

Polymers comprising halide ligands may also be suitable precursor polymers. It is expected that halide ligands would be substantially eliminated during pyrolysis to temperatures similar to those used in the following examples. (Polyvinylchloride or PVC for instance retains little or no chlorine when pyrolyzed under inert gas at a temperature near 1000° C. The product exhibits an x-ray diffraction pattern characteristic of a hard carbon prepared at that temperature.)

For purposes of further illustration, the following discussion is provided for the specific example wherein B is Si and there is little hydrogen and oxygen present (ie. z and n approximately zero). From the Silicon-Carbon phase information provided in R. W. Olesinski and G. J. Abbaschian, Bull. Alloy Phase Diagrams 5, 486 (1984), the only equilibrium phases which form when mixtures of the atoms are cooled from high temperatures are carbon, silicon, and silicon carbide. The compounds of the invention are predominantly carbon, with some dispersed Si atoms within, and not simply a mixture of bulk Si and C nor a mixture of large grains of SiC and C as predicted at equilibrium. With regards to the structure as determined by x-ray diffraction methods, it is important to realize that silicon has 14 electrons per atom and carbon has only 6 electrons per atom. Since the scattered x-ray intensity from an atom is roughly proportional to the square of the number of electrons it has, the x-ray pattern should be very sensitive to tile silicon. Silicon-carbon-oxygen compounds of the invention have been prepared containing substantial amounts of Si yet with no evidence of crystalline Si nor SiC nor $SiO_2$ in the x-ray patterns. (Amorphous silicon would have been expected to crystallize at the temperatures used in the preparation.) Thus, as in the aforementioned co-pending Canadian patent application filed May 3, 1994, the silicon atoms most likely are monodispersed along with oxygen within the host carbon.

One method for making compounds of the invention is to pyrolyze a suitable precursor or mixture of precursors that contain both carbon and the desired alloying element. The pyrolysis should be performed under a controlled atmosphere to prevent the formation of oxides of carbon and/or the alloying element. A suitable reaction system could consist of a reaction tube (quartz for example) installed in a conventional tube furnace wherein the tube has sealed inlet and outlet connections for purposes of controlling the atmosphere therein. The precursor/s could thus be pyrolyzed in the reaction tube under an inert gas flow or even under reduced pressure. Additionally, controlled partial reduction or oxidation can be achieved by admitting controlled amounts of an appropriate gas.

To ensure good product yields, the precursor/s should substantially pyrolyze rather than simply evaporate. Thus, polymer precursors seem preferred. Such pyrolysis is performed at a temperature above the decomposition temperature of the polymer and below the minimum of the temperatures for forming a carbide or oxide of the alloying element B. (Depending on the precursors employed, oxygen may be present in the polymer itself and thus may react with B to form an oxide even in the absence of oxygen gas.) The temperature for forming said carbide or oxide will be dependent on the polymer used and thus varies accordingly. It may be advantageous to incorporate soaking periods at several temperatures as part of the heat treatment. For example, a low temperature soak below about 500° C. could be used to gel a polymer (if it were a liquid initially) prior to a final heating to the pyrolysis temperature. The heating profile can be adjusted to maximize product yield and to control the product stoichiometry.

As mentioned previously, a suitable silicon containing polymer is obviously used in the pyrolysis. Such a precursor might be selected from the group of siloxanes having formula:

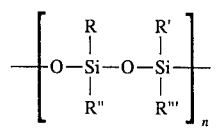

wherein R, R', R", and R'" are alkyl, aryl, or general ligands. The examples to follow show successful preparations using a member of this group, polymethylphenylsiloxane, wherein R=R'=methyl and R"=R'"=phenyl. Pyrolysis temperatures in this instance were above or equal to about 900° C. and below or equal to about 1100° C. It is believed however that lower pyrolysis temperatures (ego perhaps as low as 700° C.) may also be suitable. Also, a successful preparation involved use of polyphenylsesquisiloxane wherein the pyrolysis temperature in this instance was about 1000° C. Based on the preceding, other potentially suitable silicon containing precursors include members of the groups of poly(siloxanesilphenylenes), poly(silmethylenes), polysilanes, or poly(silphenylenes). Members in each group are commercially available but the products of pyrolysis may not have been considered to be insertion compounds previously. FIG. 1 shows the chemical structures for each of these potential precursors along with that of the aforementioned group of siloxanes and of polyphenylsesquisiloxane The groups R, R', R", R'" in this figure denote alkyl, aryl, or general ligands in the usual notation of organic chemistry. The specific ligands methyl and phenyl are denoted Me and Ph respectively where appropriate. (A suitable reference in this regard is J. E. Mark, H. A. Allcock, and R. West, *Inorganic Polymers*, published by Prentice-Hall, Englewood Cliffs, N.J. (1992) pp141–237.)

The silicon containing product of the aforementioned process has no alkali metal inserted as prepared. Alkali metal atoms, in particular Li, can be inserted thereafter via chemical or electrochemical means (such as in a lithium or lithium ion battery).

A variety of battery embodiments are possible using anode material prepared by the method of the invention. Miniature laboratory batteries employing a lithium metal anode are described in the examples to follow. However, a preferred construction for a lithium ion product is that depicted for a conventional spiral-wound type battery in the cross-sectional view of FIG. 2. A jelly roll 4 is created by spirally winding a cathode foil (not shown), an anode foil (not shown), and two microporous polyolefin sheets (not shown) that act as separators.

Cathode foils are prepared by applying a mixture of a suitable cathode material, such as a lithiated transition metal oxide, possibly other powdered cathode material if desired, a binder, and a conductive dilutant onto a thin aluminum foil. Typically, the application method first involves dissolving the binder in a suitable liquid carrier. Then, a slurry is prepared using this solution plus the other powdered solid components. The slurry is then coated uniformly onto the substrate foil. Afterwards, the carrier solvent is evaporated away. Often, both sides of the aluminum foil substrate are coated in this manner and subsequently the cathode foil is calendered.

Anode foils are prepared in a like manner except that a powdered carbonaceous compound of the invention is used instead of the cathode material and thin copper foil is usually used instead of aluminum. Anode foils are typically slightly wider than the cathode foils in order to ensure that anode foil is always opposite cathode foil. This feature is illustrated with the cathode upper edge 13, cathode lower edge 14, anode upper edge 12, and anode lower edge 15 depicted in FIG. 2.

Figure 2:
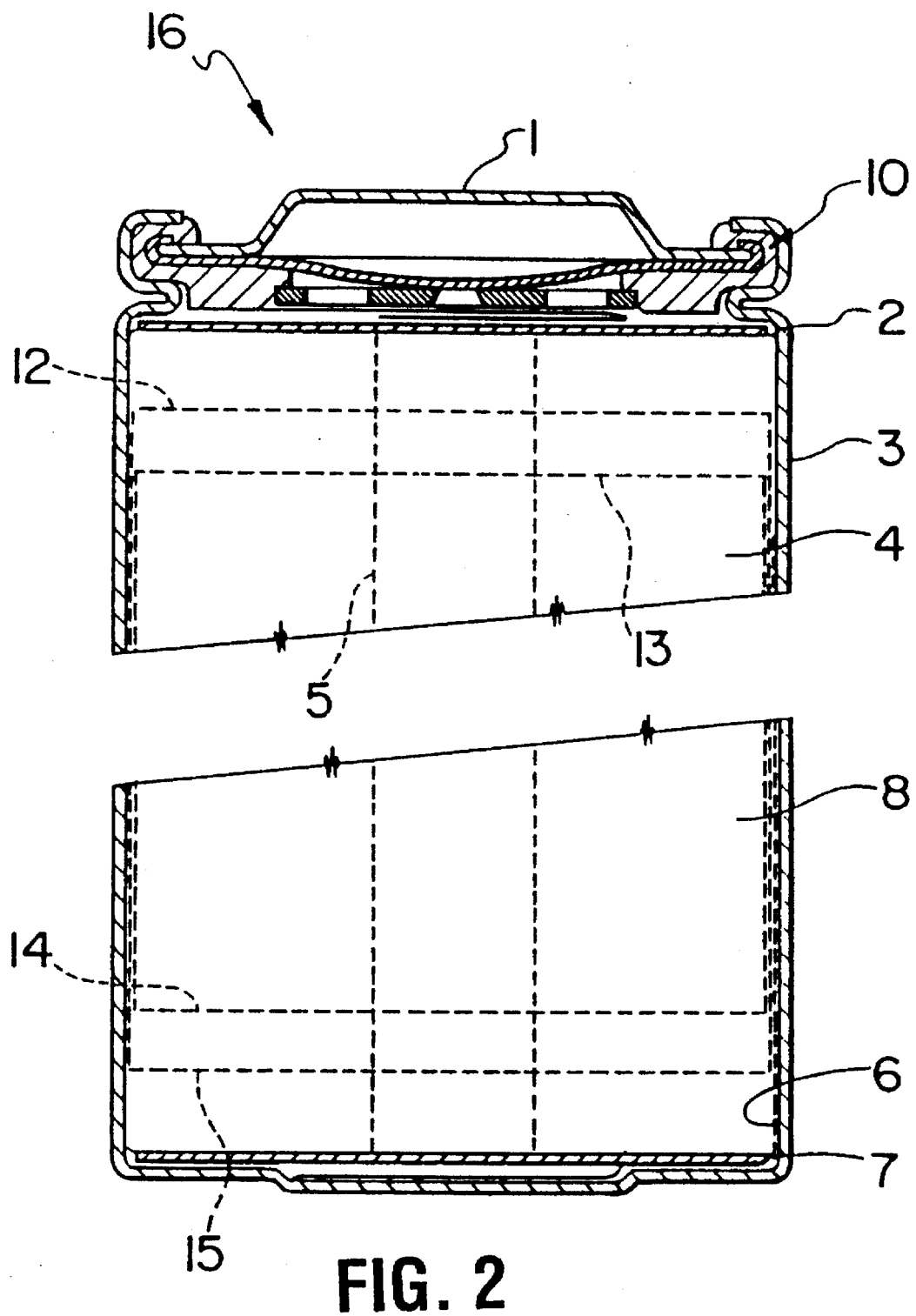
FIG. 2 shows a cross-sectional view of a conventional lithium ion spiral-wound type battery.

The jelly roll 4 is inserted into a conventional battery can 3. A header 1 and gasket 10 are used to seal the battery 16. The header may include safety devices if desired. A combination safety vent and pressure operated disconnect device may be employed. FIG. 2 shows one such combination that is described in detail in Canadian Patent Application No. 2,099,657. Additionally, a positive thermal coefficient device (PTC) may be incorporated into the header to limit the short circuit current capability of the battery. The external surface of the header 1 is used as the positive terminal, while the external surface of the can 3 serves as the negative terminal.

Appropriate cathode tab 5 and anode tab 6 connections are made to connect the internal electrodes to the external terminals. Appropriate insulating pieces 2 and 7 may be inserted to prevent the possibility of internal shorting. Prior to crimping the header 1 to the can 3 in order to seal the battery, electrolyte 8 is added to fill the porous spaces in the jelly roll 4.

Those skilled in the art will understand that the types of and amounts of the component materials must be chosen based on component material properties and the desired performance and safety requirements. The compounds prepared in the examples to follow have significantly increased irreversible capacity for lithium along with an increased reversible capacity over that of many typical commercial carbonaceous anode materials. This must be taken into account in the battery design. Alternately, compounds with reduced irreversible capacity must be employed. Generally an electrical conditioning step, involving at least the first recharge of the battery, is part of the assembly process. Again, the determination of an appropriate conditioning step along with the setting of the battery operating parameters (eg. voltage, current, and temperature limits) would be required of someone familiar with the field.

Other configurations or components are possible for the batteries of the invention. For example, a prismatic format is considered highly desirable and possible. A miniature embodiment, eg. coin cell, is also possible and the general construction of such cells is described in the laboratory coin cell examples to follow.

The following examples are provided to illustrate certain aspects of the invention but should not be construed as limiting in any way. Where indicated, powder x-ray diffraction was used to characterize samples. A Seimens D5000 diffractometer equipped with a copper target x-ray tube and a diffracted beam monochromator was used for these experiments. The samples were made by filling a 2 mm deep well in a stainless steel block with powder and levelling the surface. The samples were sometimes loosely packed, and diffraction peaks from the stainless steel holder could occasionally be observed.

Chemical analyses were performed on the samples as indicated using a variety of methods. Carbon, hydrogen, and nitrogen content was determined using a standard CHN analysis (gas chromatographic analysis after combustion of the samples in air). However, as expected from the absence of nitrogen in the starting materials, only trace amounts of nitrogen were present. The results for carbon content were not considered to be strictly accurate because silicon tends to bind substantial amounts of carbon in the combustion and thus prevents it from reaching the gas phase. Nonetheless, the data was in rough agreement with values obtained by other methods.

Laser-ablation inductively coupled mass spectroscopy (LA) was also employed to analyze some of the samples and estimate their carbon/silicon atomic ratio. In this method, a small quantity of sample is vaporized under a high powered laser beam. The vaporized fragments are carried in an inert gas stream to a plasma torch where they are atomized, ionized, and then injected into a mass spectrometer. A silicon carbide reference was used as a standard for calibration purposes. This method is believed to be quite accurate and agrees well with values inferred from CHN analyses coupled with the assumption that no Si is lost in the pyrolysis.

An attempt was made to directly analyze for oxygen content using a technique that involves placing the sample on a nickel coated carbon substrate heated to 1100° C. and hoping that the catalytic action of the nickel converts all the oxygen in the sample to CO, which is then detected by a gas chromatograph. However, only small amounts of oxygen were detected using this method. Consequently, this method is believed to be unreliable since it certainly gave results inconsistent with results inferred from other analyses performed herein.

As explained in the following examples, both thermal gravimetric analysis (TGA) and residual gas analysis (RGA) techniques were also used to estimate the stoichiometry of the samples.

Figure 3:
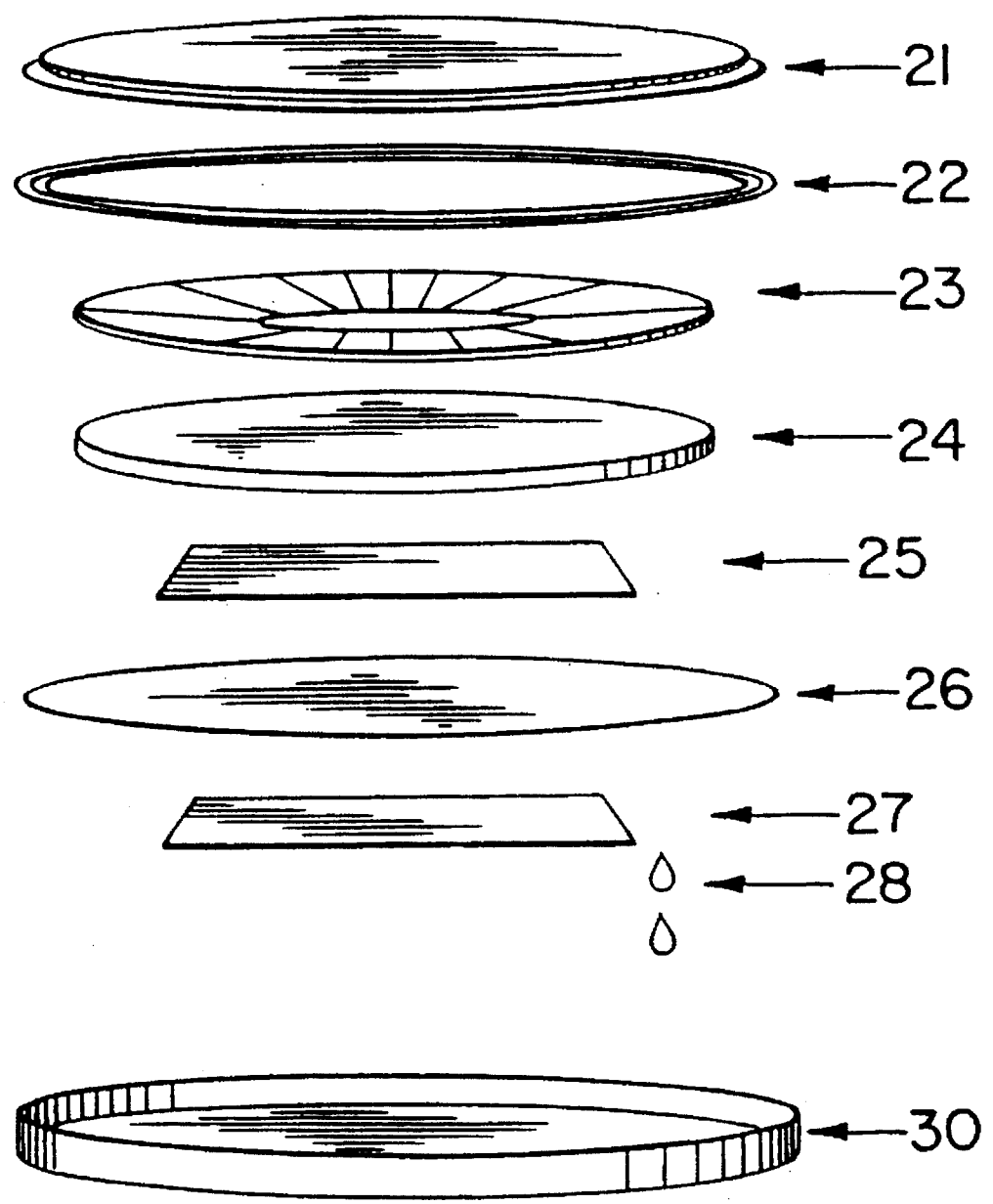
FIG. 3 depicts an exploded view of the laboratory coin cell battery used in the examples.

Laboratory coin cell batteries were used to determine electrochemical characteristics. These were assembled using conventional 2325 hardware and with assembly taking place in an argon filled glove box as described in J. R. Dahn et al, Electrochimica Acta, 38, 1179 (1993). FIG. 3 shows an exploded view of the coin cell type battery. For purposes of analysis, the samples were used as cathodes in these batteries opposite a lithium metal anode. A stainless steel cap 21 and special oxidation resistant case 30 comprise the container and also serve as negative and positive terminals respectively. A gasket 22 is used as a seal and also serves to separate the two terminals. Mechanical pressure is applied to the stack comprising lithium anode 25, separator 26, and sample cathode 27 by means of mild steel disc spring 23 and stainless disc 24. The disc spring was selected such that a pressure of about 15 bar was applied following closure of the battery. 125 μm thick metal foil was used as the lithium anode 25. Celgard® 2502 microporous polypropylene film was used as the separator 26. The electrolyte 28 was a solution of 1M $LiN(CF_3SO_2)_2$ salt dissolved in a solvent mixture of ethylene carbonate and diethyl carbonate in a volume ratio of 50/50.

Sample cathodes 27 were made using a mixture of powdered sample compound plus Super S (trademark of Ensagri) carbon black conductive dilutant and polyvinylidene fluoride (PVDF) binder (in amounts of about 5% and 10% by weight respectively to that of the sample) uniformly coated on thin copper foil. The powdered sample and the carbon black were initially added to a solution of 20% PVDF in N-methylpyrollidinone (NMP) to form a slurry such that 10% of the final electrode mass would be PVDF. Excess NMP was then added until the slurry reached a smooth syrupy viscosity. The slurry was then spread on small preweighed pieces of Cu foil (about 1.5 $cm^2$ in area) using a spreader, and the NMP was evaporated off at about 90° C. in air. Once the sample cathode stock was dried, it was compressed between flat plates at about 25 bar pressure. These electrodes were then weighed and the weight of the foil, the PVDF, and the carbon black were subtracted to obtain the active electrode mass.

After construction, the coin cell batteries were removed from the glove box, thermostatted at 30°±1° C., and then charged and discharged using constant current cyclers with ±1% current stability. Data was logged whenever the cell voltage changed by more than 0.005 V. Currents were adjusted according to the amount of active material, depending on the desired test.

For purposes of comparison, examples originally presented in the aforementioned co-pending Canadian patent application filed May 3, 1994 are given in the following two Comparative Examples.

Comparative Example 1

Figure 4:
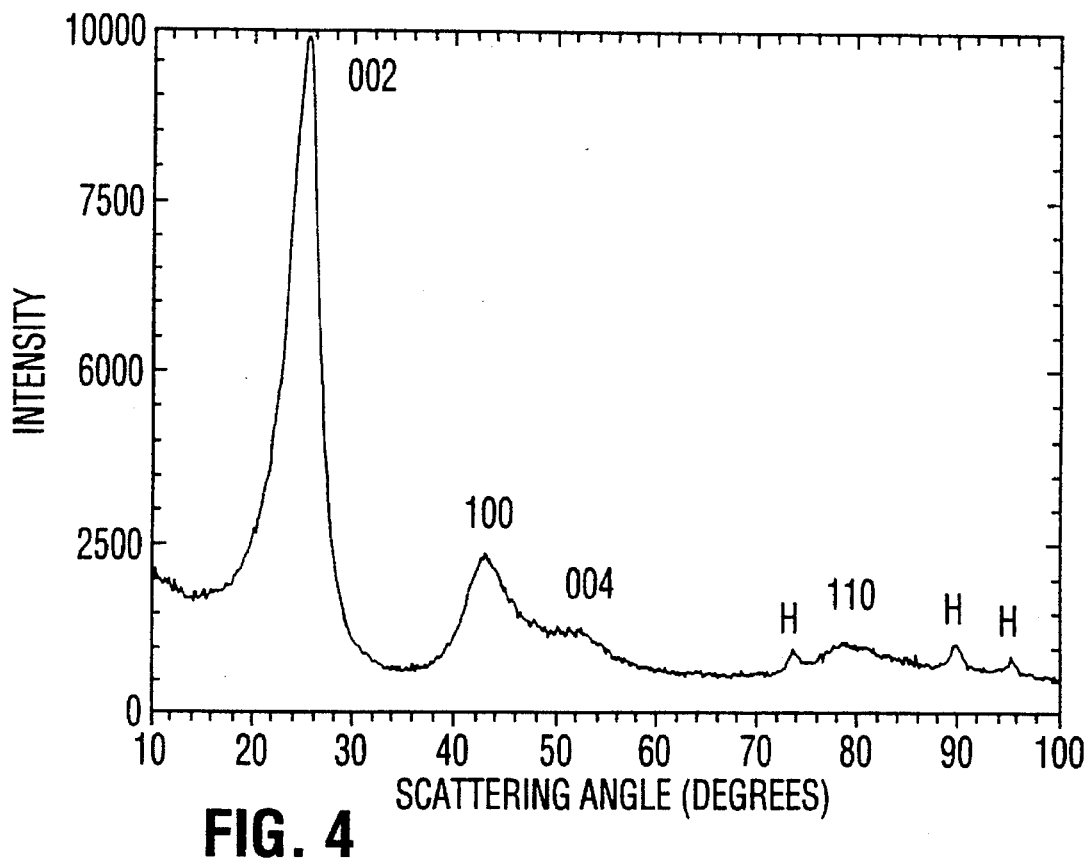
FIG. 4 shows the x-ray diffraction pattern for the material of Comparative Example 1. Peaks from the stainless steel holder are indicated with an H. Peaks from the carbon are indicated by their Miller indices.

Benzene was pyrolyzed in a CVD reactor under argon flow at 950° C. The fine powder product, denoted sample I, was recovered and analyzed by x-ray diffraction. FIG. 4 shows the x-ray diffraction pattern for this material, which is typical of a soft carbon prepared at this temperature (see H. Shi et al., Journal of Applied Crystallography, 26, 827, (1993)). Well developed Bragg Peaks are clearly observed. The chemical composition was estimated using CHN analysis results and the assumption that no oxygen nor silicon was present in the sample (since neither element should be present in the benzene precursor). The results of the chemical analysis and estimated stoichiometry are shown in the following Table 2.

Additionally, a laboratory coin cell battery was prepared using this sample as described previously. The battery was then discharged, charged, and discharged again at currents corresponding to 3.7 mA/g of sample.

Comparative Example 2

Figure 5:
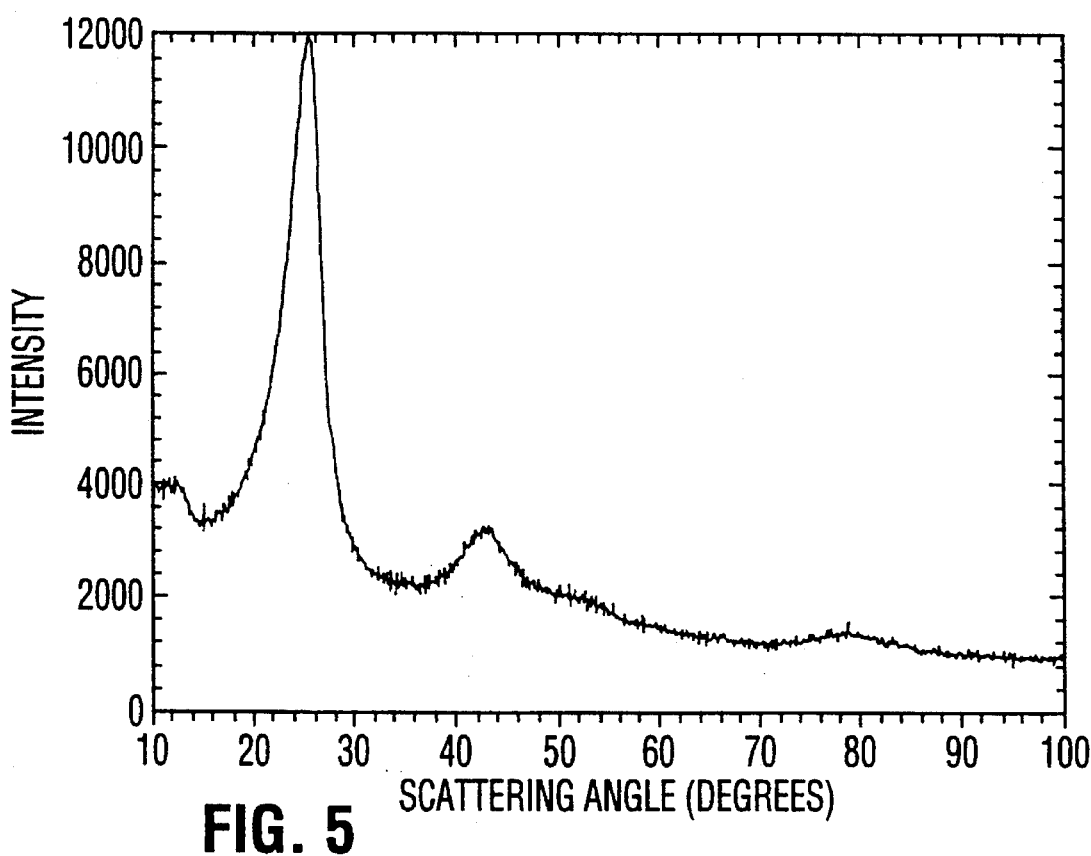
FIG. 5 shows the x-ray diffraction pattern for the material of Comparative Example 2.

Benzene and dimethyldichlorosilane were co-pyrolyzed in a CVD reactor under argon flow at 950° C. The product, denoted sample II, was analyzed as in the preceding Example. FIG. 5 shows the x-ray diffraction pattern for sample II and is similar to that of FIG. 4. Silicon is incorporated within sample II (about 6 atomic percent silicon as shown later) yet it does not affect the diffraction pattern, strongly implying that the silicon is located within the disorganized regions of the host in this case. The chemical composition of this sample was estimated using a TGA method and results of the CHN analysis. The TGA method consists of heating a sample in air to 1100° C. on the balance pan of a TGA instrument and measuring the weight loss. The sample consists mainly of carbon and silicon. Thus, if weight losses due to the presence of the small amount of hydrogen and/or oxygen is ignored, and if it is additionally assumed that the carbon is completely removed as $CO_2$ or CO and that the silicon is completely oxidized to $SiO_2$, then the silicon and carbon content can be determined from the final to initial mass ratio. (The silicon content y in $Si_yC_{1-y}$ is given by $y=12(m_f/m_i)/[60.1-16.1(m_f/m_i)]$ where $m_f$ and $m_i$ are the final and initial TGA masses respectively. X-ray diffraction results obtained on this and other Si containing samples tested in this way did indeed indicate the presence of $SiO_2$ only.) The results of the chemical analysis and estimated stoichiometry are shown in the following Table 2.

Inventive Example 1

Polymethylphenylsiloxane polymer precursor (Dow 710 fluid product of Dow) was pyrolyzed under flowing argon in a tube furnace apparatus as mentioned in the Description. Three samples, denoted III, IV, and V, were prepared by heating to 900° C., 1000° C., and 1100° C. respectively. In each case, the sample temperature was ramped to the soaking temperature at a rate of about 20° C./min. Thereafter, the soaking temperature was maintained for 1 hour, followed by a cool down to room temperature. The argon flow was maintained until the sample temperature fell below 100° C. Alumina boats were used to contain the samples in a quartz reactor tube The initial sample fluid mass was near 12 grams, while about 4 grams of solid black reaction product was obtained in each case after pyrolysis. About 30% of the liquid sample is estimated to have simply evaporated before actual pyrolysis occurred.

Figure 6:
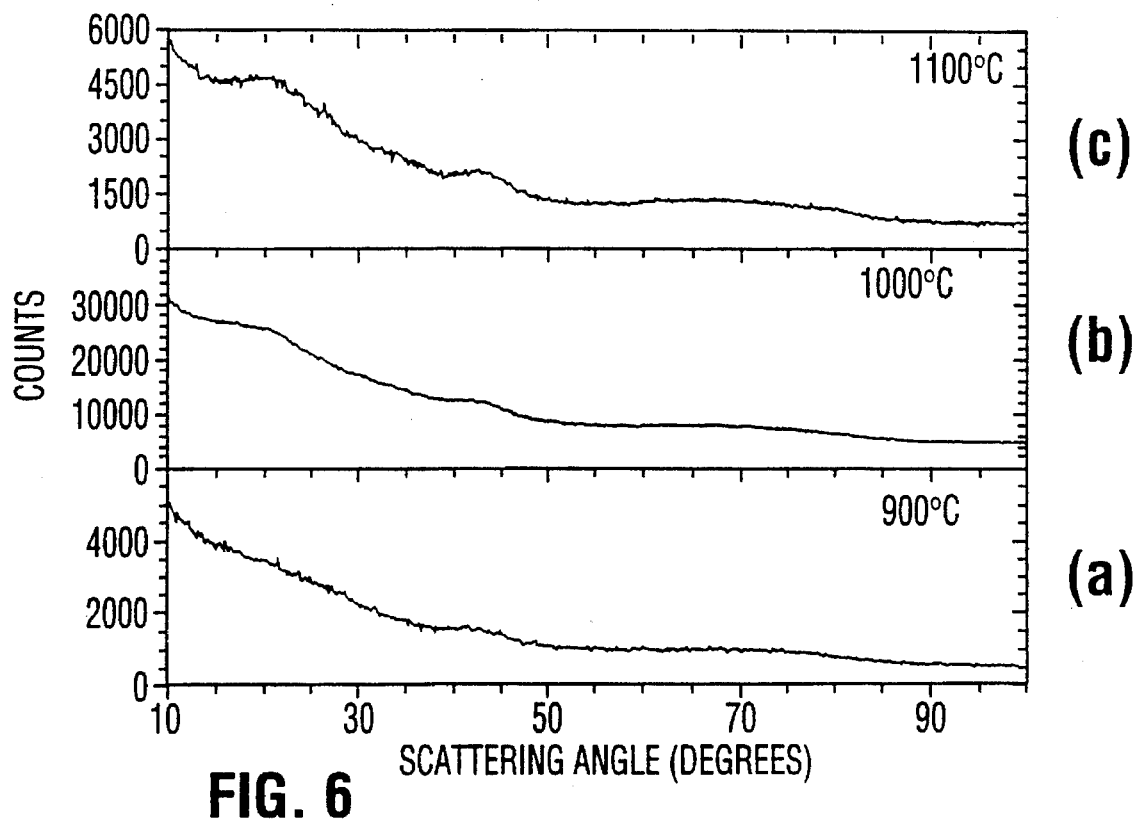
FIGS. 6a, b, and c show the powder x-ray diffraction patterns of the samples III, IV, and V of Inventive Example 1 respectively.

FIGS. 6a, b, and c show the powder x-ray diffraction patterns of these samples III, IV, and V respectively. CHN and LA analyses were performed on these samples as described previously. Additionally, the stoichiometry was estimated for each sample using the results of these analyses and the assumption that neither silicon nor oxygen was lost during pyrolysis of the polymer precursor. Thus, the silicon:oxygen ratio in the samples will be the same as that of the polymer precursor, or 1:1. (This assumption seems reasonable based on an analysis of the gaseous decomposition products during the pyrolysis. A small sample of polymethylphenylsiloxane was pyrolyzed in a TGA apparatus coupled to an RGA instrument. The gaseous decomposition products were analyzed as generated up to a temperature of about 700° C. It was found that benzene was the predominant species evolved. Only a very small amount of oxygen containing species was observed.) Results of these analyses and the estimated stoichiometry are shown in the following Table 2.

Figure 7:
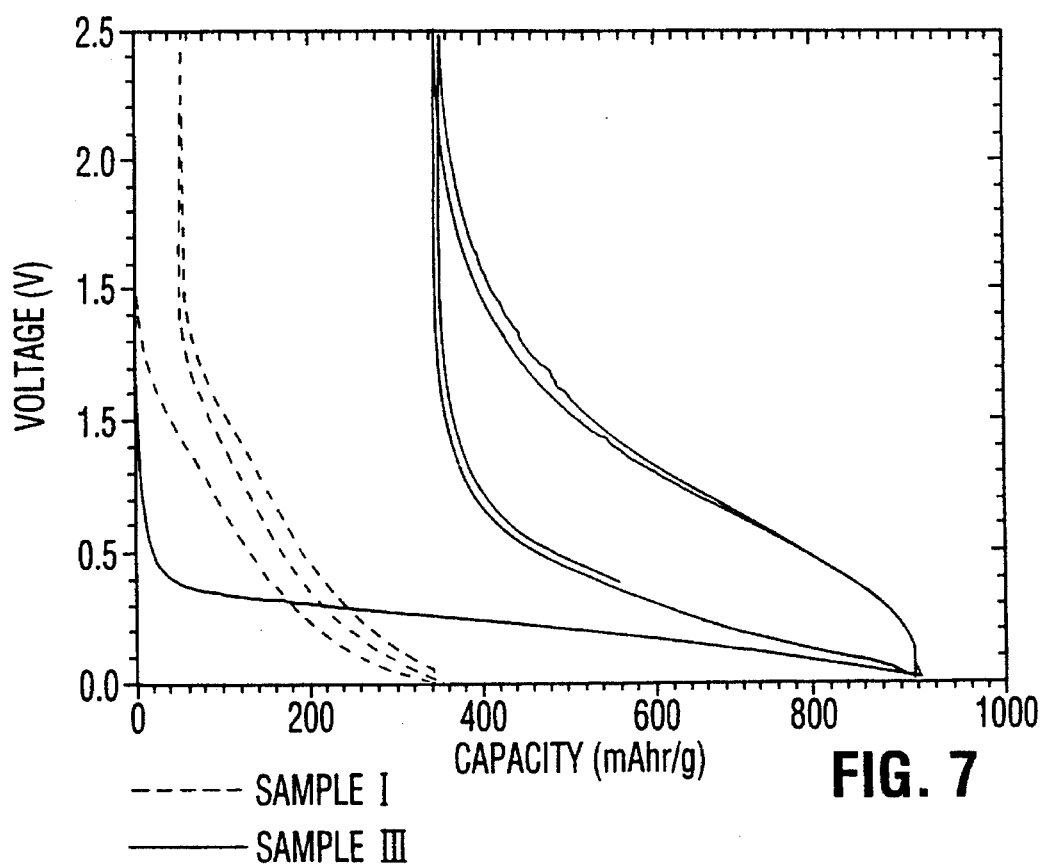
FIG. 7 shows a comparison between the voltage versus capacity profiles for comparative sample I and inventive sample III.
Figure 8:
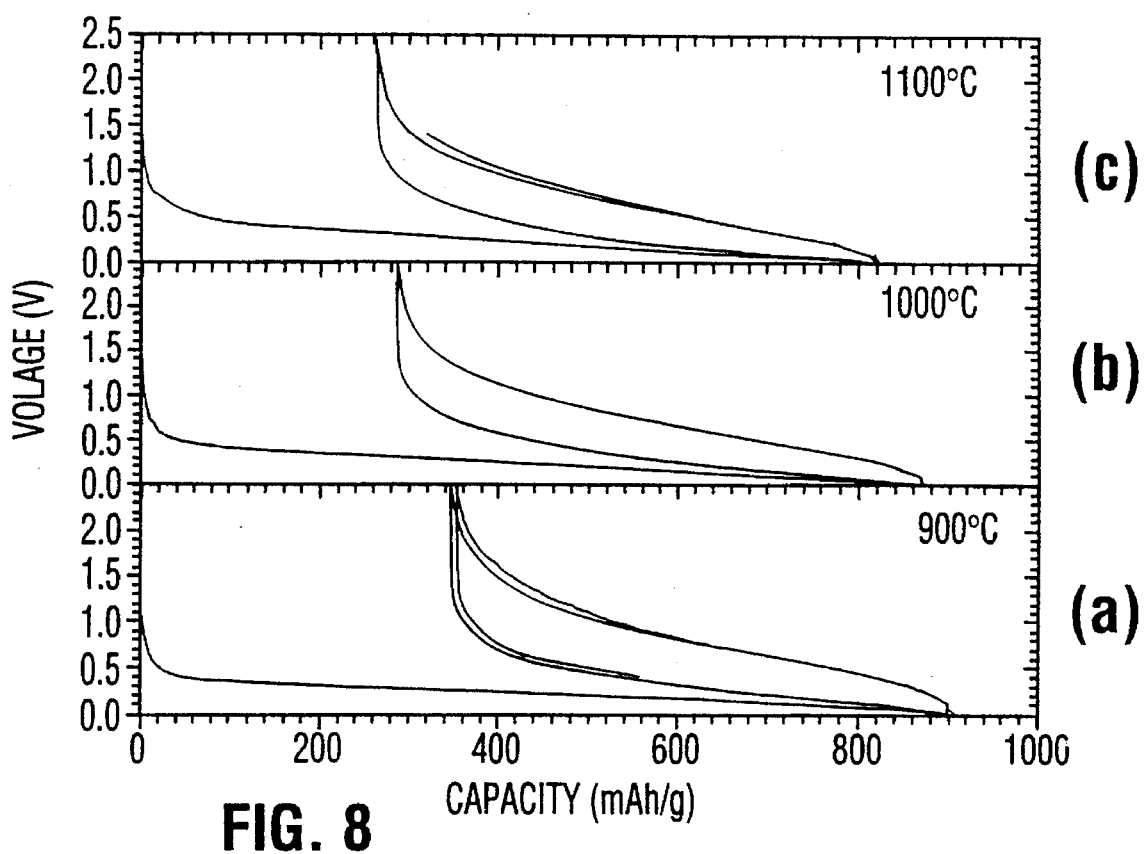
FIGS. 8a, b, and c show the voltage versus capacity profiles for the batteries comprising inventive samples III, IV, and V respectively.

Laboratory coin cell batteries were prepared as described previously and were then discharged, charged, and discharged again at currents corresponding to 14.8 mA/g. FIG. 7 shows a comparison between the voltage versus capacity profiles for comparative sample I and inventive sample III. The former attains a reversible capacity of about 300 mAh/g, while the latter attains a greater reversible capacity of about 550 mAh/g. (Herein, the average capacity of the first charge and the second discharge of the battery is taken to be the reversible capacity.) However, the irreversible capacity of sample III is much greater than that of sample I. This can be reduced somewhat by further heating however as is shown in FIG. 8.

FIGS. 8a, b, and c show the voltage versus capacity profiles for the batteries comprising inventive samples III, IV, and V respectively. The reversible capacity is approximately maintained at higher pyrolysis temperatures while the irreversible capacity is somewhat reduced.

Figure 9:
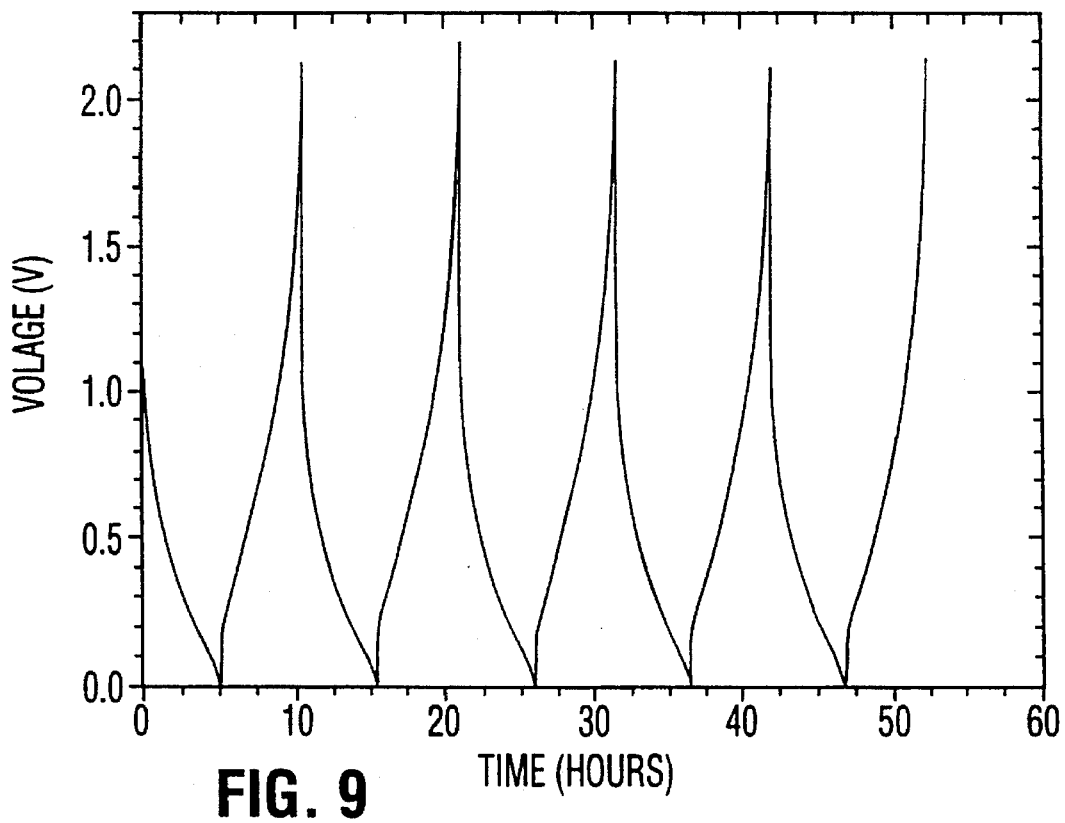
FIG. 9 shows the voltage versus time plot of the battery comprising inventive sample V over representative cycles 10–14.
Figure 10:
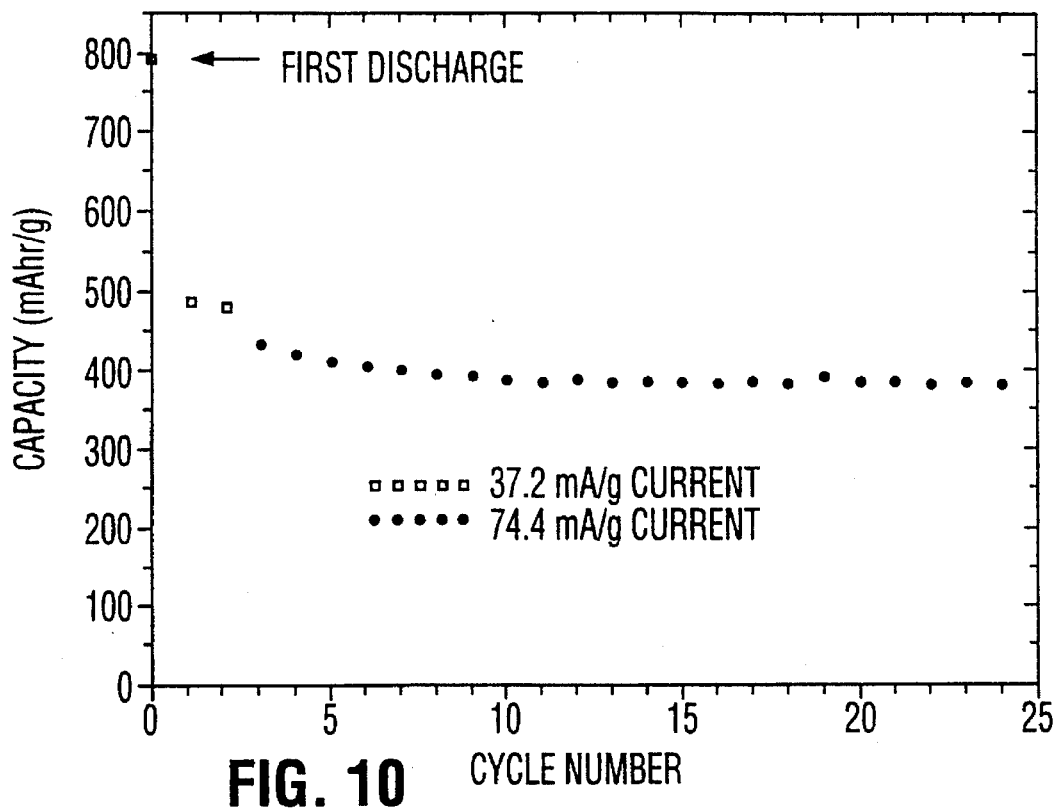
FIG. 10 shows the capacity versus cycle number data for the battery comprising inventive sample V. The open data points were measured at a current of 37.2 mA/g and the solid points were measured at a current of 74 mA/g.
Figure 11:
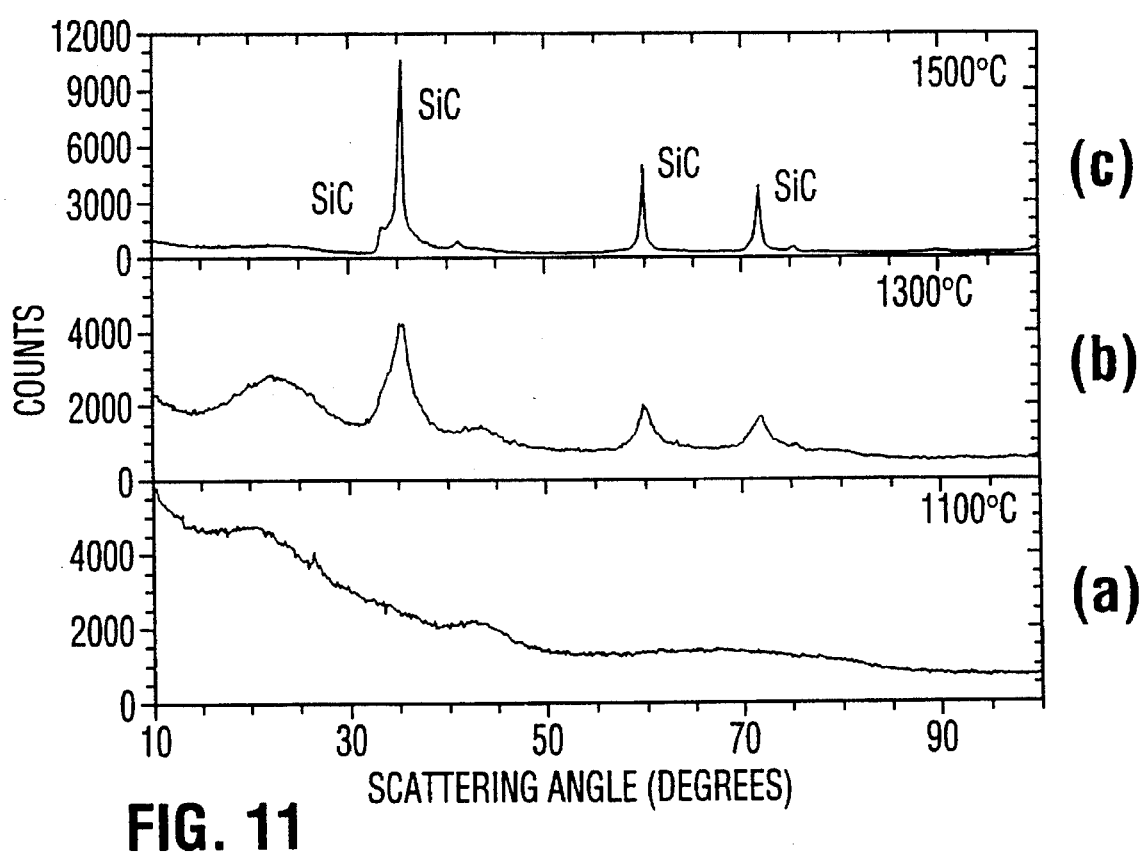
FIGS. 11a, b, and c show a comparison of the powder x-ray diffraction patterns of the samples V, Va, and Vb of Inventive Example 1.
Figure 12:
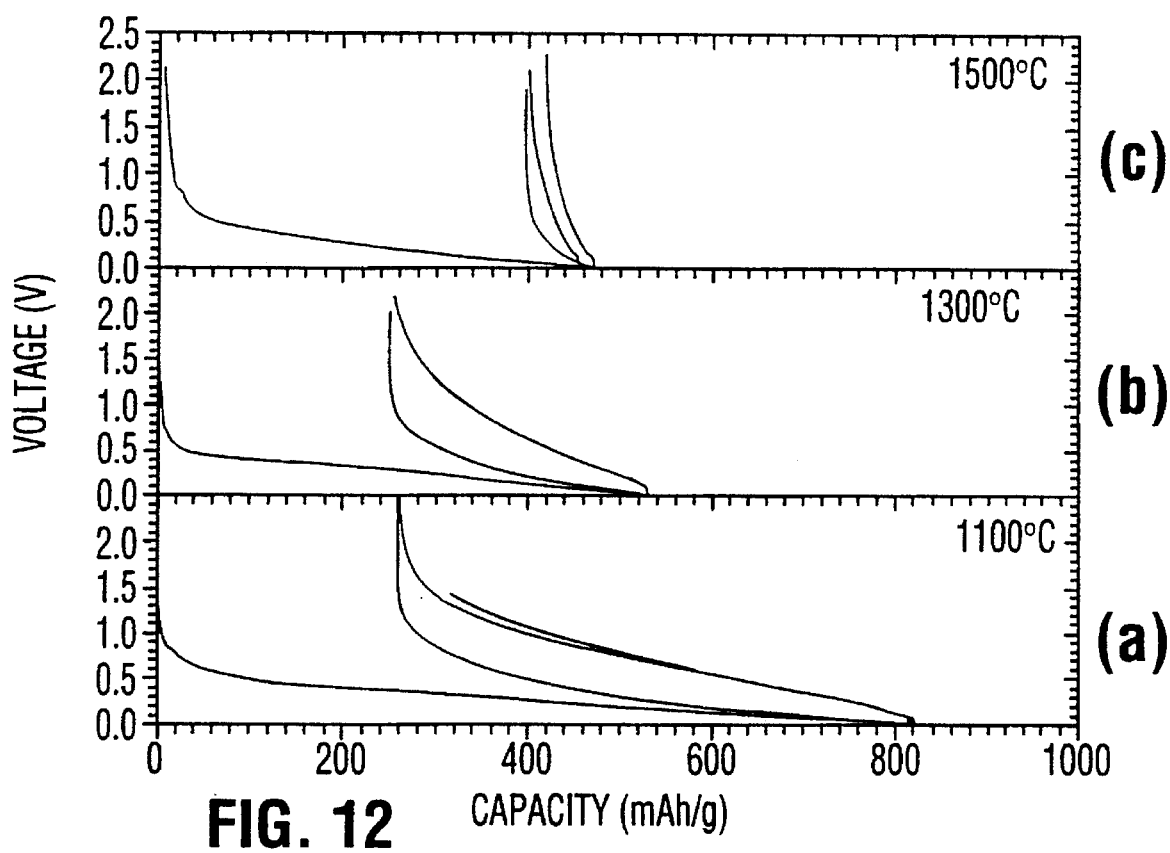
FIGS. 12a, b, and c compare the voltage versus capacity profiles for the batteries comprising samples V, Va, and Vb respectively.

The battery comprising sample V was further cycled at currents corresponding to 74 mA/g. FIG. 9 shows the voltage versus time plot of this battery over representative cycles 10-14. The cycling behaviour is very reproducible. FIG. 10 shows the capacity versus cycle number data for this battery. For illustrative purposes, some of sample V was used for pyrolysis experiments at higher temperatures. 1 gram amounts were heated under flowing argon for one hour at 1300° C. and at 1500° C. These samples are denoted Va and Vb respectively. FIGS. 11a, b, and c compare the x-ray diffraction patterns for samples V, Va, and Vb respectively. Silicon carbide formation is clearly detected in samples Va and Vb. (It is suspected that the gaseous decomposition products at these temperatures are CO and $H_2$. Using the estimated stoichiometry in Table 2, the removal of all the hydrogen and oxygen present in 1 gram of sample V would result in 0.64 grams of product. The recovered weight of sample Vb was 0.63 grams.) Laboratory coin cell batteries were also prepared using the latter two samples. FIGS. 12a, b, and c compare the voltage versus capacity profiles for samples V, Va, and Vb respectively. The reversible capacity of the latter two samples is greatly reduced compared to that of samples II, IV, or V. Thus, it appears that the pyrolysis temperature must be limited appropriately to maximize reversible capacity and to prevent formation of silicon carbide.

Inventive Example 2

Figure 13:
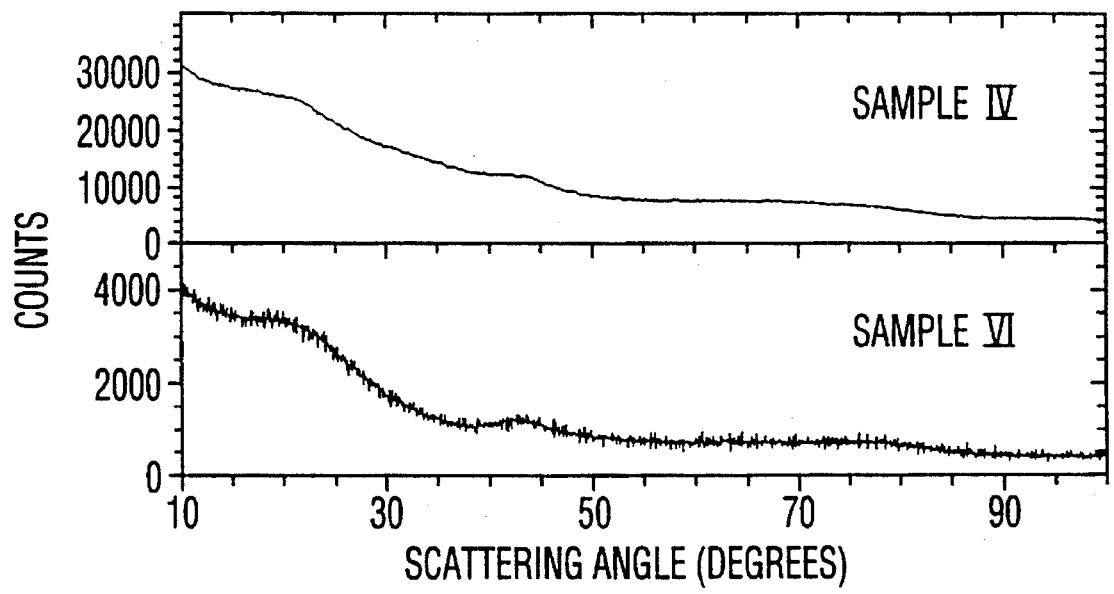
FIG. 13 shows the powder x-ray diffraction patterns of samples VI and IV of the Inventive Examples.

Polyphenylsesquisiloxane solid was obtained from United Chemical Technologies Inc. 3.66 grams of this solid was pyrolyzed under argon at 1000° C. in the tube furnace apparatus used for Inventive Example 1. 2.86 grams of shiny grey-black material was recovered and there was no evidence of evaporation of polymer from the boat. This sample is denoted sample VI. FIG. 13 shows the powder x-ray diffraction patterns of sample VI and that of sample IV of Inventive Example 1. The patterns of these materials are very similar.

In a manner similar to Comparative Example 2, the stoichiometry of the sample was estimated using the weight loss observed as a result of pyrolysis and the assumption that said loss was entirely due to the evolution of benzene as the decomposition product. (Unlike Inventive Example 1, significant evaporation of the precursor polymer was not observed and the TGA/RGA results mentioned in the following indicate that benzene only was the significant decomposition product.) The amount of hydrogen present was unknown in this case, so a guess of n=1 was used for the estimated stoichiometry shown in Table 2.

Figure 14:
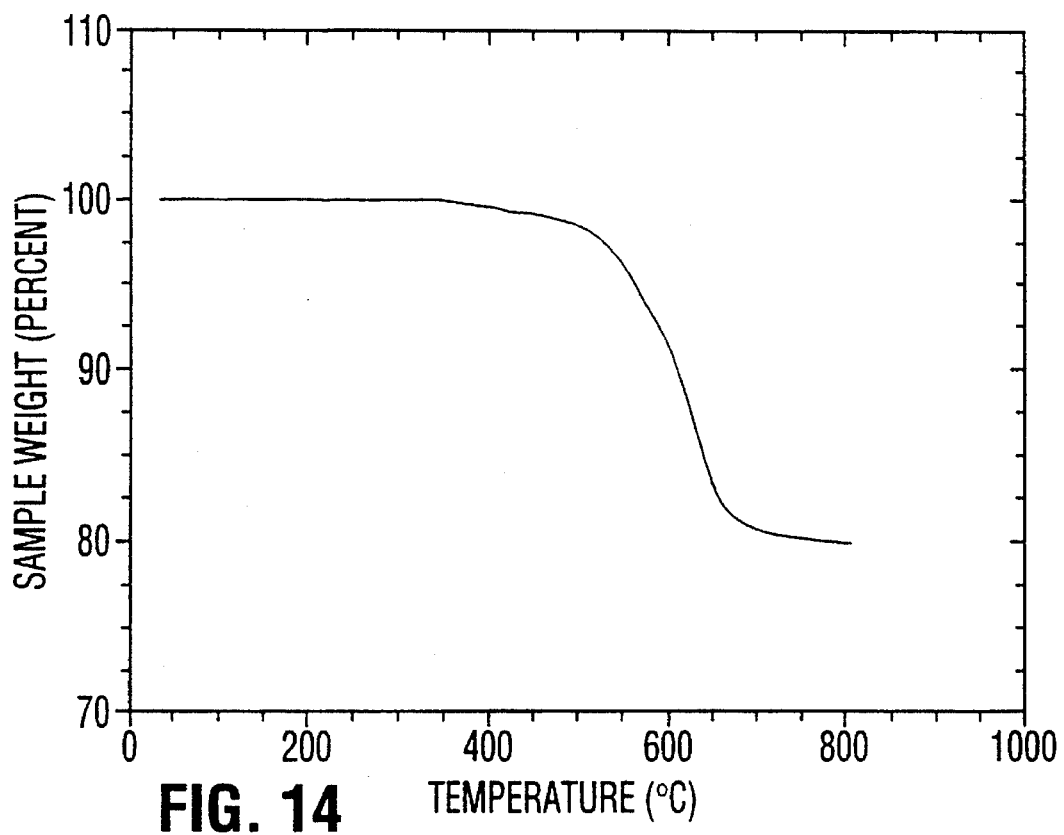
FIG. 14 shows the weight loss versus temperature curve for polyphenylsesquisiloxane as determined by TGA in Inventive Example 2.

A fresh sample of polyphenylsesquisiloxane was heated in the aforementioned TGA/RGA apparatus under argon where the temperature was ramped at 20° C. per minute. The weight loss versus temperature curve for this sample is shown in FIG. 14. Weight loss can be seen to occur at temperatures as low as 500° C. By 700° C., only about 80% of the sample remains. The RGA indicated that benzene was generated predominantly up to about 700° C. Some smaller amount of hydrogen was also generated. This suggests that samples similar to sample VI might be prepared at temperatures as low as 500° C.

Figure 15:
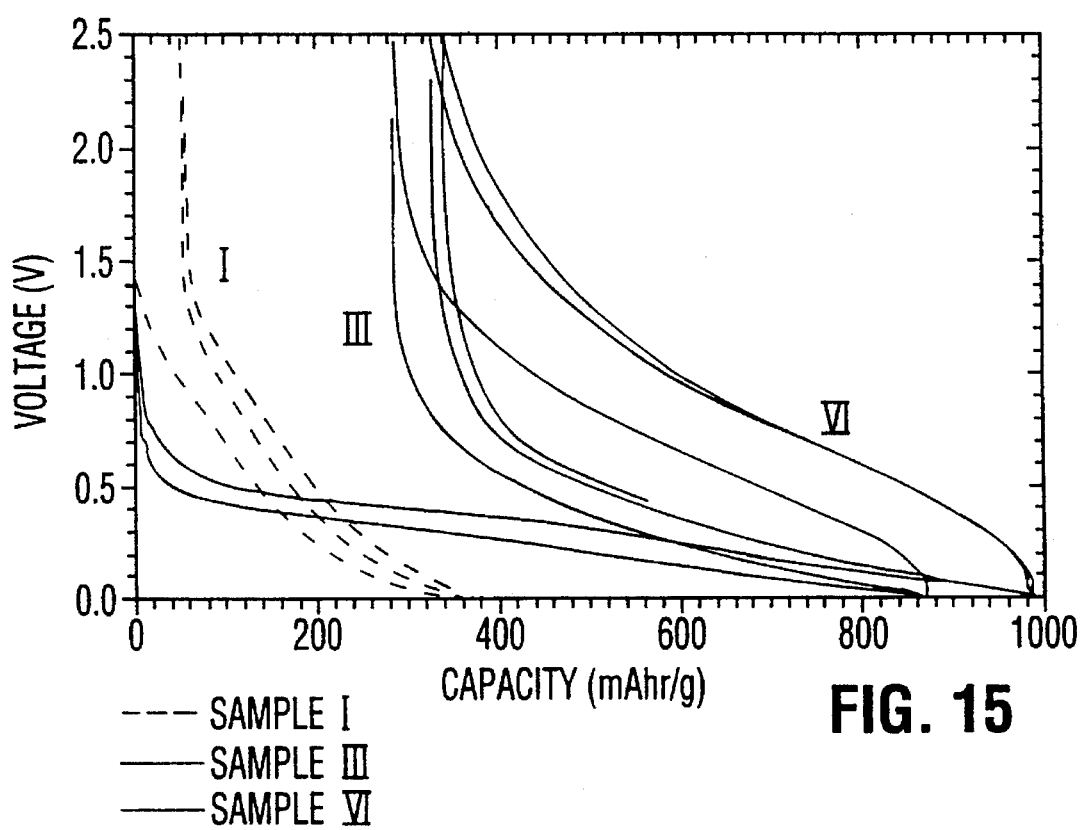
FIG. 15 shows a comparison of the voltage versus capacity profiles for the batteries comprising comparative sample I and inventive samples III and VI.

A laboratory coin cell battery was prepared as described previously and was then discharged, charged, and discharged again at currents corresponding to 14.8 mA/g. FIG. 15 shows a comparison between the voltage versus capacity profiles for the batteries made with comparative sample I, inventive sample III, and inventive sample VI. The two inventive samples are very similar electrochemically.

TABLE 2

Summary of Chemical Analysis Results and Estimated stoichiometry of the samples

| Sample | H content by CHN (weight %) | C content by CHN (weight %) | C/Si by LA (atomic ratio) | Estimated Stoichiometry |
|---|---|---|---|---|
| I | 0.41 | 98.9 | Not available | $C_1H_{0.03}$ |
| II | 0.2 | 86.5 | Not available | $Si_{0.06}C_{0.94}H_{0.02}$ |
| III | 1.0 | 39 | 2.3 | $Si_{0.26}C_{0.74}O_{0.26}H_{0.26}$ |
| IV | 0.6 | 40 | 2.6 | $Si_{0.26}C_{0.74}O_{0.26}H_{0.15}$ |
| V | 0.5 | Not available | 2.7 | $Si_{0.26}C_{0.74}O_{0.26}H_{0.13}$ |
| VI | Not available | Not available | Not available | $Si_{0.21}C_{0.79}O_{0.32}H_{0.21}$ |

Compounds of the invention can be denoted by the formula $A_xSi_yC_{1-y}O_zH_n$. Therefore, according to the preceding table, the maximum value for y in the examples appears to be less than or equal to approximately 0.26, or about 0.3. The ratio z/y is less than or equal to about 1.5 and the maximum value n is 0.26, or about 0.3.

These examples illustrate that enhanced reversible capacity can be obtained (greater than that of pure graphite) and maintained without significant capacity loss upon cycling using compounds of the invention. The compounds appear predominantly amorphous with distinctively different x-ray diffraction patterns from those of the Comparative Examples.

As will be apparent to those skilled in the art in the light of the foregoing disclosure, many alterations and modifications are possible in the practice of this invention without departing from the spirit or scope thereof. For example, mixtures of more than one precursor may be used to prepare compounds. Additionally, it may not be necessary when preparing silicon containing carbonaceous compounds to employ polymer precursors having silicon based main chains (silicon must be present though obviously). Accordingly, the scope of the invention is to be construed in accordance with the substance defined by the following claims.

What is claimed is:

1. A carbonaceous insertion compound comprising:
   (a) a pre-graphitic carbonaceous host C;
   (b) atoms of an alkali metal A inserted into the host C, the amount of metal A being in a range from greater than or equal to zero; and
   (c) atoms of an element B selected from the group consisting of Al, Bi, Cd, Pb, Sb, and Sn incorporated into the host C, the amount of element B being greater than zero, wherein element B alloys with metal A and the atoms of element B are incorporated predominantly as monodispersed atoms in the host C;
   wherein said carbonaceous insertion compound has a reversible specific capacity for said alkali metal greater than graphite.

2. A carbonaceous insertion compound as claimed in claim 1 wherein the structure of the compound is predominantly disorganized.

3. A carbonaceous insertion compound as claimed in claim 1 wherein A is Li.

4. A silicon-containing carbonaceous insertion compound prepared by pyrolyzing a polymer containing silicon and carbon wherein the pyrolysis is performed at a temperature above the decomposition temperature of the polymer and below the minimum of the temperatures for forming SiC or $SiO_2$ from the pyrolyzed polymer, wherein the polymer is selected from the group consisting of poly(silmethylenes), poly(siloxane-silphenylenes), polysilanes, polyphenylsesquisiloxanes and poly(silphenylenes), and said silicon-containing carbonaceous insertion compound has a reversible specific capacity for alkali metal greater than graphite.

5. A carbonaceous insertion compound as claimed in claim 4, wherein the pyrolysis is performed under an inert atmosphere.

6. A carbonaceous insertion compound as claimed in claim 4 wherein the polymer is a poly(silmethylene).

7. A carbonaceous insertion compound as claimed in claim 4 wherein the polymer ms a polysilane.

8. A carbonaceous insertion compound as claimed in claim 4 wherein the polymer is a poly(silphenylene).

9. A carbonaceous insertion compound as claimed in claim 4 wherein the polymer containing silicon and carbon to be pyrolyzed has the formula $Si_{y'}C_{1-y'}O_{z'}H_{n'}$ wherein O is oxygen, H is hydrogen, and y',z',n' are numbers; y' being in the range from greater than zero to less than about 0.3; and the ratio z'/y' being less than or equal to about 1.5.

10. The carbonaceous insertion compound of claim 4, wherein said polymer is selected from the group consisting of poly(simethylenes), polysilanes and poly(silphenylenes).

11. A process for preparing a carbonaceous insertion compound comprising:
   (a) a pre-graphitic carbonaceous host C;
   (b) atoms of an alkali metal A inserted into the host C, the amount of metal A being in the range from greater than or equal to zero; and
   (c) atoms of an element B selected from the group consisting of Al, Bi, Cd, Pb, Sb and Sn incorporated into the host C, the amount of element B being greater than zero, wherein element B alloys with metal A and the Atoms of element B are incorporate predominantly as monodispersed atoms in the host C, said process comprising: pyrolyzing a polymer containing the elements B and carbon wherein the pyrolysis is performed at a temperature above the decomposition temperature of the polymer and below the minimum of the temperatures for forming a carbide or oxide of the element B from the pyrolyzed polymer, so that a carbonaceous insertion compound is obtained having a reversible specific capacity for said alkali metal greater than graphite.

12. A process for preparing a silicon-containing carbonaceous insertion compound comprising:
   (a) a pre-graphitic carbonaceous host C;

(b) atoms of an alkali metal A inserted into the host C, the amount of the metal A being in a range from greater than or equal to zero; and (c) Si atoms incorporated into the host C predominantly as monodispersed atoms in the host C, said process comprising: pyrolyzing a polymer containing silicon and carbon and selected from the group consisting of poly(silmethylenes), poly(siloxane-silphenylenes), polysilanes, polyphenylsesquisiloxanes and poly(silphenylenes) at a temperature above the decomposing temperature of the polymer and below the minimum of the temperatures for forming SiC or $SiO_2$ from the pyrolyzed polymer, so that a silicon-containing carbonaceous insertion compound is obtained having a reversible specific capacity for said alkali metal greater than graphite.

13. The process of claim 12, wherein said polymer is selected from the group consisting of poly(simethylenes), polysilanes and poly(silphenylenes).

14. A process as claimed in claim 12 wherein the polymer is polyphenylsesquisiloxane.

15. A process as claimed in claim 14, wherein the pyrolysis is performed at a temperature above about 500° C.

16. A process as claimed in claim 15, wherein the pyrolysis is performed at a temperature about 1000° C.

17. A process as claimed in claim 11, 12, or 14 wherein the pyrolysis is performed under an inert atmosphere.

18. The process as claimed in claim 12, wherein the polymer has the formula $A_xSi_yC_{1-y}O_zH_n$ wherein O is oxygen, H is hydrogen and x, y, z, n are numbers; x being greater than zero; y being in the range from greater than zero to less than about 0.3; the ratio z/y being greater than or equal to zero and less than or equal to about 1.5; and n being less than about 0.3.

19. An electrochemical device comprising an electrode wherein a portion of the electrode comprises a carbonaceous insertion compound comprising:

(a) a pre-graphitic carbonaceous host C;

(b) atoms of an alkali metal A inserted into the host C, the amount of metal A being in a range from greater than or equal to zero; and (c) atoms of an element B selected from the group consisting of Al, Bi, Cd, Pb, Sb, and Sn incorporated into the host C, the amount of element B being greater than zero, wherein element B alloys with metal A and the atoms of element B are incorporated predominantly as monodispersed atoms in the host C;

wherein said carbonaceous insertion compound has a reversible specific capacity for said alkali metal greater than graphite.

20. A battery comprising an electrode wherein a portion of the electrode comprises a carbonaceous insertion compound comprising:

(a) a pre-graphitic carbonaceous host C;

(b) atoms of an alkali metal A inserted into the host C, the amount of metal A being in a range from greater than or equal to zero; and (c) atoms of an element B selected from the group consisting of Al, Bi, Cd, Pb, Sb and Sn incorporated into the host C, the amount of element B being greater than zero, wherein element B alloys with metal A and the atoms of element B are incorporated predominantly as monodispersed atoms in the host C;

wherein said carbonaceous insertion compound has a reversible specific capacity for said alkali metal greater than graphite.

21. A non-aqueous battery comprising:

(a) a cathode comprising a lithium insertion compound;

(b) a non-aqueous electrolyte comprising a lithium salt dissolved in a mixture of non-aqueous solvents; and (c) an anode comprising a carbonaceous insertion compound comprising:

(1) a pre-graphitic carbonaceous host C;

(2) atoms of an alkali metal A inserted into the host C, the amount of metal A being in a range from greater than or equal to zero; and (3) atoms of an element B selected from the group consisting of Al, Bi, Cd, Pb, Sb and Sn incorporated into the host C, the amount of element B being greater than zero, wherein element B alloys with metal A and the atoms of element B are incorporated predominantly as monodispersed atoms in the host C, wherein the alkali metal A is Li and said carbonaceous insertion compound has a reversible specific capacity for Li greater than graphite.

22. An electrochemical device comprising an electrode wherein a portion of the electrode comprises a silicon-containing carbonaceous insertion compound prepared by pyrolyzing a polymer containing silicon and carbon wherein the pyrolysis is performed at a temperature above the decomposition temperature of the polymer and below the minimum of the temperatures for forming SiC or $SiO_2$ from the pyrolyzed polymer, wherein said polymer is selected from the group consisting of poly(Simethylenes), poly(siloxane-silphenylenes), polysilanes, polyphenylsesquisiloxanes and poly(silphenylenes), wherein said silicon-containing carbonaceous insertion compound has a reversible specific capacity for alkali metal greater than graphite.

23. The electrochemical device of claim 22, wherein said polymer is selected from the group consisting of poly(simethylenes), polysilanes and poly(silphenylenes).

24. A battery comprising an electrode wherein a portion of the electrode comprises a silicon-containing carbonaceous insertion compound prepared by pyrolyzing a polymer containing silicon and carbon wherein the pyrolysis is performed at a temperature above the decomposition temperature of the polymer and below the minimum of the temperatures for forming SiC or $SiO_2$ from the pyrolyzed polymer, wherein said polymer is selected from the group consisting of poly(simethylenes), poly(siloxane-silphenylenes), polysilanes, polyphenylsesquisiloxanes and poly(silphenylenes), wherein said silicon-containing carbonaceous insertion compound has a reversible specific capacity for alkali metal greater than graphite.

25. The battery of claim 24, wherein said polymer is selected from the group consisting of poly(simethylenes), polysilanes and poly(silphenylenes).

26. A non-aqueous battery comprising:

(a) a cathode comprising a lithium insertion compound;

(b) a non-aqueous electrolyte comprising a lithium salt dissolved in a mixture of non-aqueous solvent; and (c) an anode comprising a silicon-containing carbonaceous insertion compound prepared by pyrolyzing a polymer containing silicon and carbon wherein the pyrolysis is performed at a temperature above the decomposition temperature of the polymer and below the minimum of the temperatures for forming SiC or $SiO_2$ from the pyrolyzed polymer, wherein said polymer is selected from the group consisting of poly(simethylenes), poly(siloxane-silphenylenes), polysilanes, polyphenylsesquisiloxanes and poly(silphenylenes), and wherein said silicon-containing carbonaceous insertion compound has a reversible specific capacity for alkali metal greater than graphite.

27. The non-aqueous battery of claim 26, wherein said polymer is selected from the group consisting of poly(simethylenes), polysilanes and poly(silphenylenes).

28. A method of operating an electrochemical device comprising an electrode, wherein a portion of the electrode comprises a carbonaceous insertion compound, wherein said carbonaceous insertion compound comprises:

(a) a pre-graphitic carbonaceous host C; and (b) atoms of an element B incorporated predominantly as monodispersed atoms into said host C, the amount of the element B being greater than zero, and the element B being capable of forming alloys with an alkali metal and selected from the group consisting of Al, Bi, Cd, Pb, Sb, Si and Sn, wherein said method includes the step of:

repeatedly electrochemically reversibly inserting atoms of an alkali metal into said carbonaceous insertion compound in an amount effective to provide a reversible specific capacity for said electrochemical device greater than 372 mAh per gram of said carbonaceous insertion compound.

29. A method as claimed in claim 28, wherein the structure of said carbonaceous insertion compound is predominantly disorganized.

30. A method as claimed in claim 28, wherein said carbonaceous insertion compound has the formula $Si_yC_{1-y}O_xH_n$, wherein O is oxygen, H is hydrogen, and y, z, n are numbers; y being in the range from greater than zero to less than about 0.3; the ratio z/y being greater than or equal to zero and less than or equal to about 1.5; and n being less than about 0.3.

31. A method as claimed in claim 28, wherein said alkali metal is Li.

32. A method as claimed in claim 28, wherein said carbonaceous insertion compound is prepared by pyrolyzing a polymer containing silicon and carbon at a temperature above the decomposition temperature of the polymer and below the minimum of the temperatures for forming SiC or $SiO_2$ from the pyrolyzed polymer.

33. A method as claimed in claim 32; wherein the polymer is selected from the group of siloxanes having the formula

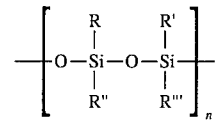

wherein R, R', R", and R''' are alkyl, aryl or ligands.

34. A method as claimed in claim 33, wherein R and R' are methyl and R" and R''' are phenyl.

35. A method as claimed in claim 34, wherein the pyrolysis is performed at a temperature above or equal to about 900° C. and below or equal to about 1100° C.

36. A method as claimed in claim 32, wherein the polymer is polyphenylsesquisiloxane.

37. A method as claimed in claim 36, wherein the pyrolysis is performed at a temperature above about 500° C.

38. A method as claimed in claim 37, wherein the pyrolysis is performed at a temperature about 1000° C.

39. A method as claimed in claim 33, 34 or 36, wherein the pyrolysis is performed under an inert atmosphere.

40. A method as claimed in claim 32, wherein the polymer is a poly(siloxane-silphenylene).

41. A method as claimed in claim 32, wherein the polymer is a poly(silmethylene).

42. A method as claimed in claim 32, wherein the polymer is a polysilane.

43. A method as claimed in claim 32, wherein the polymer is a poly(silphenylene).

44. A method as claimed in claim 32, wherein the polymer containing silicon and carbon to be pyrolyzed has the formula $Si_{y'}C_{1-y'}O_{z'}H_{n'}$, wherein O is oxygen, H is hydrogen and y', z', n' are numbers; y' being in the range from greater than zero to less than about 0.3; and the ratio z'/y' being less than or equal to about 1.5.

45. A method as claimed in claim 28, wherein the electrochemical device is a battery.

46. A method as claimed in claim 45, wherein the battery is non-aqueous and comprises:

a cathode comprising a lithium insertion compound;

a non-aqueous electrolyte comprising a lithium salt dissolved in a mixture of non-aqueous solvents; and an anode comprising the carbonaceous insertion compound, wherein said alkali metal is Li.

* * * * *

UNITED STATES PATENT AND TRADEMARK OFFICE
CERTIFICATE OF CORRECTION

PATENT NO. : 5,587,256
DATED : December 24, 1996
INVENTOR(S) : Wilson et al.

It is certified that error appears in the above-identified patent and that said Letters Patent is hereby corrected as shown below:

Column 4, line 12, "Specific" should read --specific--.

Column 4, line 22, the heading "SUMMARY OF TEE INVENTION" should read "SUMMARY OF THE INVENTION--.

Column 7, line 7, "Capacity" should read --capacity--.

Column 8, line 34, "tile" should read --the--.

Column 9, line 25, "(ego perhaps as low as 700°C.)" should read --(eg. perhaps as low as 700°C)--.

Column 9, line 37, "polyphenylsesquisiloxane The" should read --polyphenylsesquisiloxane. The--.

Delete "poly(simethylenes)" throughout the patent and substitute --poly(silmethylenes)-- therefor.

Column 16, line 54, "Atoms" should read --atoms--.

Column 20, line 21, first line of claim 39, "33" should read --32--.

Signed and Sealed this

Third Day of June, 1997

*Attest:*

BRUCE LEHMAN

*Attesting Officer*  Commissioner of Patents and Trademarks